UNITED STATES PATENT OFFICE.

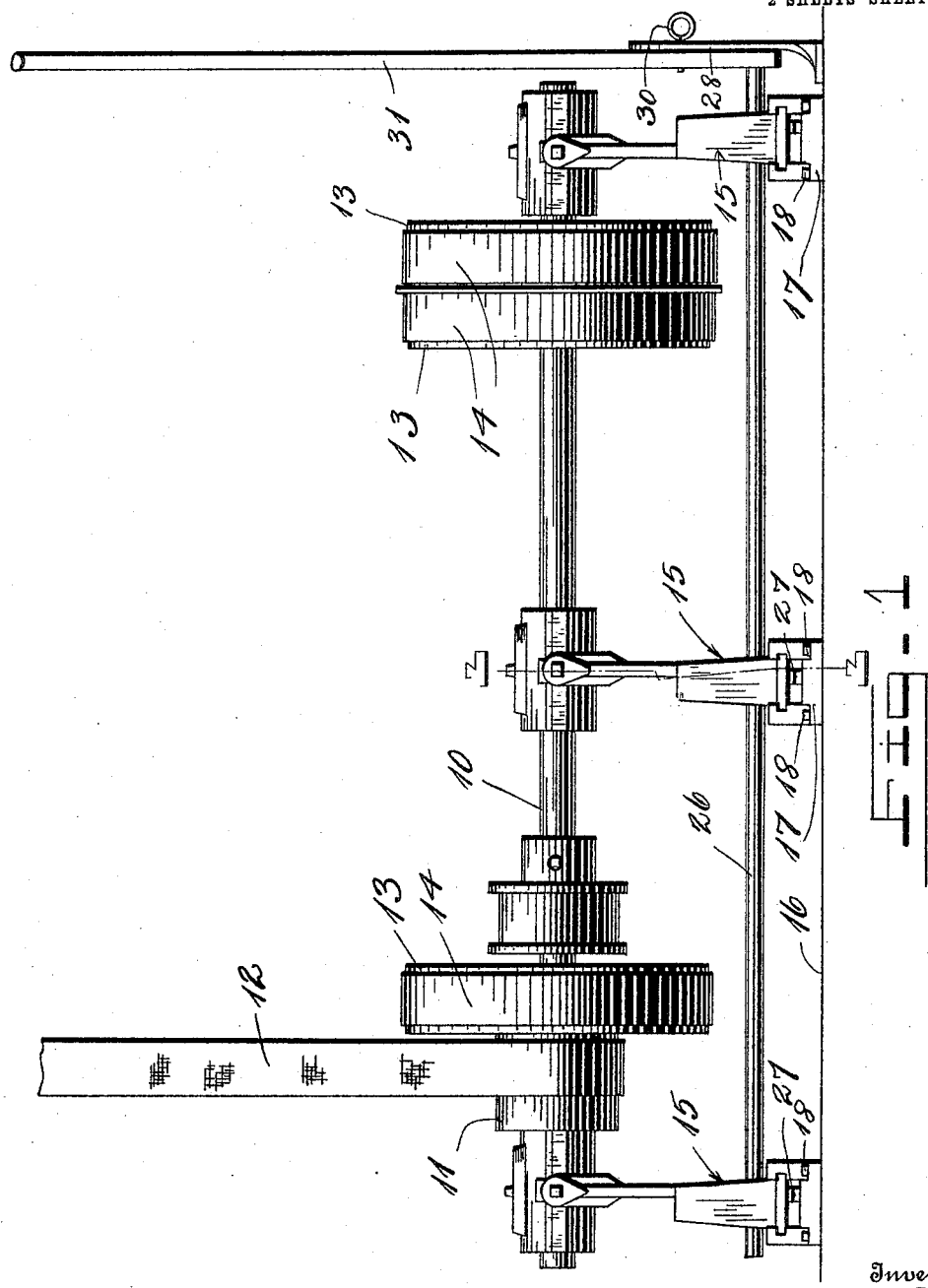

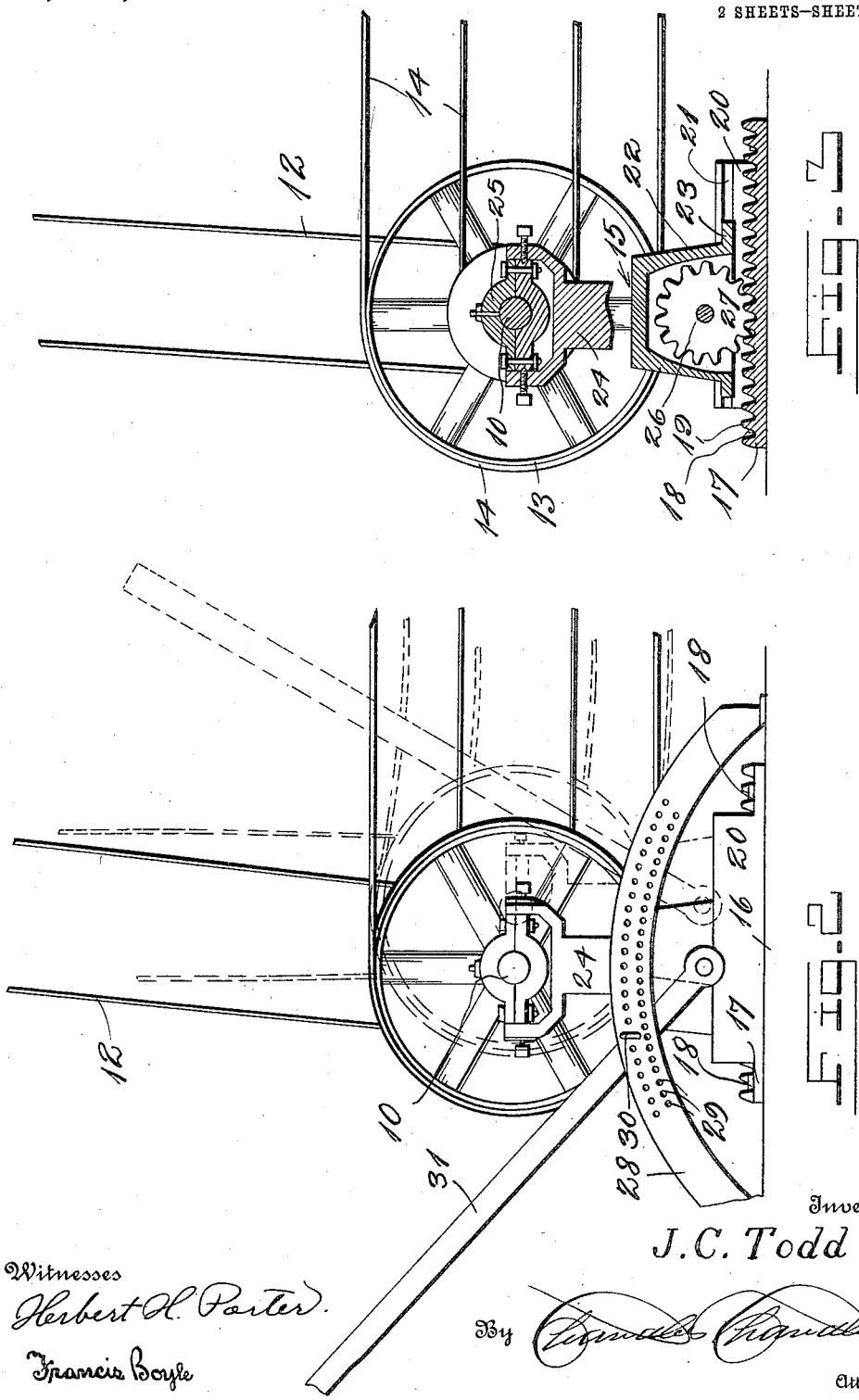

JOHN C. TODD, OF LAWRENCEBURG, TENNESSEE.

BELT-TIGHTENER.

1,075,072.

Specification of Letters Patent.

Patented Oct. 7, 1913.

Application filed December 21, 1911. Serial No. 667,113.

*To all whom it may concern:*

Be it known that I, JOHN C. TODD, a citizen of the United States, residing at Lawrenceburg, in the county of Lawrence, State of Tennessee, have invented certain new and useful Improvements in Belt-Tighteners; and I do hereby declare the following to be a full, clear, and exact description of the invention, such as will enable others skilled in the art to which it appertains to make and use the same.

This invention relates to shafts, more particularly to means for shifting a shaft to cause the belts to grip or idle on the pulleys carried by the shaft.

An object of the present invention is to provide novel pedestals or bearings for the shaft, these bearings being adjustably secured to any suitable support and being capable of backward and forward shifting movement to tighten or slacken the belts so that the latter may be maintained at all times under a proper tension to conform to various changes in temperature, it being well known that belts expand in hot weather and contract in cold weather.

A second object of the invention is to provide novel means for shifting the bearings so that the latter may be manipulated to tighten or loosen the belts when it is desired to start or stop the machine, and thus do away with the ordinary belt shifters usually utilized to attain this end.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a front elevation of a shaft equipped with my invention. Fig. 2 is an end elevation of the shaft showing the same in operative position in full lines and in inactive position in dotted lines. Fig. 3 is a vertical sectional view taken on the line 3—3 Fig. 1.

Referring now to the drawings in which like characters of reference designate similar parts, 10 designates a shaft equipped near one end with a driving pulley 11 over which a driving belt 12 is trained, and further equipped with driven pulleys, designated in general by the numeral 13, and over these pulleys are trained driven belts 14 which may be operatively connected to any preferred machine. For securing the shaft, three pedestals 15 are shown, in the present instance the pedestals being supported upon a floor 16, but it is not intended to limit the manner of supporting the pedestals to the manner shown, as the pedestals may be mounted upon a side wall, ceiling or other suitable support without departing from the spirit of the invention. Each pedestal consists in general of a bed plate 17 provided at the ends with bolts 18 for anchoring the bed plate, and provided on the top face with rack teeth 19, being further provided near the edges with upstanding flanges 20, the inner faces of which are provided with guide grooves 21. A pedestal standard 22 preferably in the form of a hollow casing is provided at the base with guide flanges 23 which fit in the guide grooves of the bed plate and slidably secure the standard thereto. The standard is equipped with a yoke 24 between the branches of which a bearing box 25 is pivotally supported, the box having a suitable bore to receive the shaft 10. For shifting the standard backwardly and forwardly on the bed plate, a shaft 26 is engaged through suitable openings formed in the sides of the standard and is equipped within the hollow standard with a gear 27 which meshes with the rack teeth 19 of the bed plate. Upon rotation of the shaft, the gears of all the pedestals will advance upon the rack teeth and by virtue of the shaft being journaled in each pedestal, all the pedestals will be simultaneously moved in the direction of rotation of the shaft. For anchoring the shaft 26 in any adjusted position to lock the pedestals stationary in adjusted position, I provide a segment 28 which is fixed to the flooring 16 in any preferred manner, and is provided with a plurality of orifices 29 through which a pintle 30 may be selectively engaged. An operating lever 31 is fixed at the lower end to the shaft 26 and provides means for manually rotating the shaft in either direction. By engaging the pintle transversely across the advanced edge of the lever, or in other words across the upper edge of the lever when thrown to final position in either direction, the lever is locked stationary to the segment and holds the shaft in adjusted position. It is obvious that a ratchet may be mounted on the hand lever and the segment provided with notches to receive this ratchet to lock the lever stationary within the scope of this invention.

In operation, suppose that the shaft is in the position shown in full lines in Fig. 2. In this position the belts are taut or in operative position. By now shifting the lever to the position shown in dotted lines, the shaft will be moved through the instrumentality of the pedestals to the position shown in dotted lines, and in this position all the belts will be slack and will be idle on the pulleys. It will thus be seen that the shaft may be shifted from time to time to stop and start the machine and thus the use of a belt shifter for this purpose is obviated. Furthermore the shaft may be shifted slightly when desired so as to accommodate the belts to changes in temperature and thus the annoying cutting and lacing of the belts to attain this end entirely obviated.

What is claimed, is:—

In a belt tightener, a pedestal, a pulley shaft carried thereby, said pedestal having an integral gear case on one side at the bottom, said gear case being open at the bottom, said gear case being formed with guide flanges, a bed plate having guideways receiving said flanges and having a rack exposed through the bottom of said gear case, a pinion concealed within said gear case and meshing with said rack, a shaft projecting through said pinion and through the sides of said gear case, a lever carried by said shaft and extending upwardly along the side of said gear case, a stationary member, and interlocking means between said lever and said member.

In testimony whereof, I affix my signature, in presence of two witnesses.

JOHN C. TODD.

Witnesses:
H. A. MORGAN,
WARREN SHORT.

---

Copies of this patent may be obtained for five cents each, by addressing the "Commissioner of Patents, Washington, D. C."